United States Patent

Nagpal et al.

[11] Patent Number: 6,077,921
[45] Date of Patent: Jun. 20, 2000

[54] POLYMERIZABLE POLYOL (ALLYL CARBONATE) COMPOSITIONS

[75] Inventors: Vidhu J. Nagpal; Charles R. Wiedrich, both of Murrysville, Pa.

[73] Assignee: PPG Industries Ohio, Inc., Cleveland, Ohio

[21] Appl. No.: 09/206,144

[22] Filed: Dec. 7, 1998

[51] Int. Cl.⁷ .................................................. C08F 18/24
[52] U.S. Cl. ........................... 526/314; 526/274; 526/286; 526/287; 526/291; 526/318.6; 526/319; 526/320; 526/322; 526/332; 526/333
[58] Field of Search ............................... 526/274, 286, 526/287, 291, 314, 318.6, 319, 320, 322, 332, 333

[56] References Cited

U.S. PATENT DOCUMENTS

| | | | |
|---|---|---|---|
| 2,370,567 | 2/1945 | Muskat et al. | 260/463 |
| 2,403,113 | 7/1946 | Muskat et al. | 260/78 |
| 4,637,698 | 1/1987 | Kwak et al. | 351/163 |
| 4,814,514 | 3/1989 | Yokota et al. | 568/608 |
| 5,273,812 | 12/1993 | Oguchi et al. | 428/220 |
| 5,296,627 | 3/1994 | Tang et al. | 558/34 |

FOREIGN PATENT DOCUMENTS

| | | |
|---|---|---|
| 0 102707 | 9/1986 | European Pat. Off. |
| 0 107300 | 12/1986 | European Pat. Off. |
| 0 216479 B1 | 2/1991 | European Pat. Off. |
| 0 216479 B2 | 8/1994 | European Pat. Off. |

*Primary Examiner*—Helen L. Pezzuto
*Attorney, Agent, or Firm*—James R. Franks; Irwin M. Stein

[57] ABSTRACT

Described is a polymerizable organic composition comprising a polyol(allyl carbonate), e.g., diethylene glycol bis(allyl carbonate), and an additive represented by the general formula $$R_2-O-(R_3O)_m-(CH_2CH_2O)_{n-1}-CH_2CH_2-X$$

wherein $R_2$ is a monovalent organic radical having a terminal ethylenically unsaturated group, e.g., allyl, $R_3O$ is a divalent radical derived from an epoxide other than ethylene oxide, e.g., butylene oxide, m is a number from 0 to 100, n is a number between 3 and 100, and X is selected from halide, hydroxyl, quaternary ammonium groups, the acid groups acetic acid, sulfonic acid, sulfuric acid, isethionic acid and phosphoric acid, salts of said acid groups, alkoxy groups and carboxylic acid ester groups. The additive is present in the composition in an amount at least sufficient such that a polymerizate, e.g., a plus lens, obtained from said composition is substantially free of tinting defects, e.g., ferns and/or moons.

14 Claims, 1 Drawing Sheet

POLYMERIZABLE POLYOL (ALLYL CARBONATE) COMPOSITIONS

The present invention relates to a polymerizable organic composition. More particularly, the present invention relates to a polymerizable composition comprising polyol(allyl carbonate) monomer and alkoxylated material having a terminal ethylenically unsaturated group, e.g., a terminal allyl group. The present invention relates also to polymerizates, e.g., lenses, obtained from said compositions.

Polymerizable organic compositions based on polyol (allyl carbonate), particularly diethylene glycol bis(allyl carbonate), and polymerizates obtained therefrom are well known in the art. Polymerizates of polymerizable organic compositions based on homopolymers of diethylene glycol bis(allyl carbonate) possess excellent clarity, good flexibility and abrasion resistance, examples of which include, ophthalmic lenses, sunglasses, and automotive and aircraft transparencies. It has been observed that tinting of polymerizates prepared from such compositions by surface impregnation of dyes can in certain instances result in an uneven tinting of the surface. Such uneven tinting is referred to as tinting failure.

When tinting failure occurs, it is often manifested as visually observable defects on the tinted surface(s) of the polymerizate, which are commonly referred to as, for example, "ferns" or "moons." In the case of tinted ophthalmic lenses, such as tinted ophthalmic lenses having a positive diopter, i.e., plus lenses, and non-corrective lenses, e.g., sunglasses, such tinting failure often results in rejection and scrapping of the tinted lens. A solution to tinting failure is desirable in order to avoid the economic loss that results from scrapping of lenses having tinting defects.

U.S. Pat. No. 5,296,627 describes terminally unsaturated poly(alkyleneoxy) surfactant compounds. The compounds of the '627 patent are described as having utility in emulsion (suspension) and solution polymerizations. The '627 patent also describes the use of such surfactant compounds as comonomers with ethylenically unsaturated monomer(s). Polyol(allyl carbonate) monomers are not described in the '627 patent.

It has now been discovered that cured polymerizates prepared from polymerizable organic compositions of the present invention are substantially free of these tinting defects, for example, tinting defects referred to in the art as ferns or moons. In accordance with the present invention there is provided a polymerizable organic composition comprising:

(a) a radically polymerizable monomer represented by the following general formula I,

$$R\text{—}[\text{—}O\text{—}C(O)\text{—}O\text{—}R_1]_i \qquad I$$

wherein R is a radical derived from a polyol having two or more hydroxy groups, $R_1$ is a radical derived from an allyl or substituted allyl group and i is a whole number from 2 to 4; and (b) an additive material represented by the following general formula II,

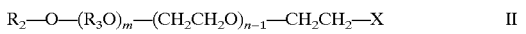

$$R_2\text{—}O\text{—}(R_3O)_m\text{—}(CH_2CH_2O)_{n-1}\text{—}CH_2CH_2\text{—}X \qquad II$$

wherein $R_2$ is a monovalent organic radical having a terminal ethylenically unsaturated group, $R_3O$ is a divalent radical derived from an epoxide other than ethylene oxide, m is a number from 0 to 100, n is a number from 3 to 100, and X is selected from the group consisting of halide (—Cl, —Br or —I), hydroxyl (—OH), quaternary ammonium groups, the acid groups acetic acid (—$CH_2$—C(O)OH), sulfonic acid (—$SO_3H$), sulfuric acid (13 O—$SO_3H$), isethionic acid (—O—$CH_2CH_2$—$SO_3H$) and phosphoric acid (—O—P(O)(OH)$_2$), salts of said acid groups, alkoxy groups (—$OR_9$) $R_9$ being an alkyl group having from 1 to 6 carbon atoms or a cycloalkyl group having 5 or 6 carbon atoms in the ring, and carboxylic acid ester groups (—O—C(O)$R_{10}$) $R_{10}$ being an alkyl group having from 1 to 6 carbon atoms or a cycloalkyl group having 5 or 6 carbon atoms in the ring, said additive material of formula II being present in said composition in an amount at least sufficient such that a polymerizate of said composition is substantially free of tinting defects.

The features that characterize the present invention are pointed out with particularity in the claims, which are annexed to and form a part of this disclosure. These and other features of the invention, its operating advantages and the specific objects obtained by its use will be more fully understood from the following detailed description and the accompanying illustrative drawing.

Other than in the operating examples, or where otherwise indicated, all numbers expressing quantities of ingredients, reaction conditions, and so forth used in the specification and claims are to be understood as modified in all instances by the term "about."

DETAILED DESCRIPTION OF THE INVENTION

Figure 1:
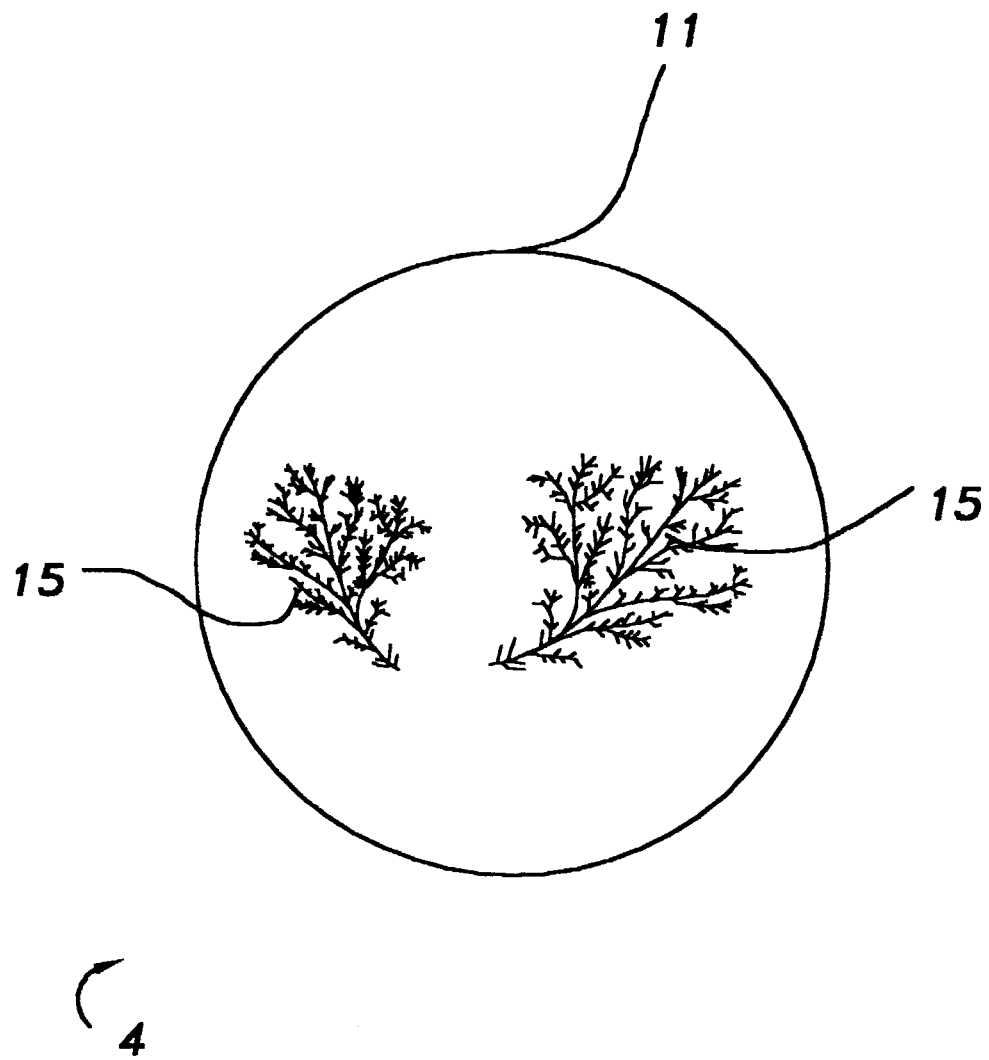
FIG. 1 is a representation of a negative image of a tinted lens having tinting defects.

The additive material described with reference to general formula II is present in the polymerizable organic compositions of the present invention in an amount at least sufficient such that polymerizates prepared from such compositions are substantially free of tinting defects. As used herein and in the claims, the term "tinting defects" and similar terms refer generally to a visually observable uneven distribution of dye over the surface of a tinted polymerizate, such as a tinted lens. More particularly, tinting defects are often visually observable as lighter colored or untinted surface patterns, sometimes in the form of ferns or moons.

Tinting defects in the form of ferns can be further described with reference to FIG. 1. The tinted polymerizate 4 of FIG. 1 is composed of a tinted plus lens 11, prepared from diethylene glycol bis(allyl carbonate) monomer, and having tinting defects 15 thereon. For purposes of illustration, the tinting defects 15 of FIG. 1 are shown as a negative image. As used herein, by "plus lens" is meant a lens having a positive (+) diopter, i.e., a lens having a positive focal length or real focal point. The tinting defects shown in the lens depicted in FIG. 1 were observed in a lens having a +5 diopter.

Tinting defects in the form of moons are typically observed as a series of concentric circles of varying tint strength on the surface of the tinted lens. In some instances a tinted lens will exhibit a combination of both moon and fern type tinting defects.

The occurrence of tinting defects with polymerizates prepared from polyol(allyl carbonate) monomers is a largely statistical phenomenon. Accordingly, in order to determine if a polymerizable composition can be used to prepare polymerizates that are "substantially free of tinting defects," more than one polymerizate, e.g., several lenses, should be prepared. Optionally, a set of comparative polymerizates may also be prepared under similar conditions, e.g., using the same cure cycle, from a composition that is known to result in tinting defects. The specific number of polymerizates that must be prepared is often determined by trial and error. In the case of ophthalmic lenses, typically between 10 and 100 lenses are prepared to determine if they 10 are substantially free of tinting defects. Such a determination is described in further detail in the Examples herein.

The amount of additive (b) present in the polymerizable composition of the present invention may vary and will depend on the monomers comprising the polymerizable composition and the cure cycle used. Additive (b) has a terminal ethylenically unsaturated group which permits additive (b) to be radically polymerizable. It is postulated that additive (b) is copolymerizable with monomers represented by formula I. Therefore additive (b) may be referred to herein as a co-monomer or simply as an additive or additive material.

Typically, additive (b) is present in the composition of the instant invention in an amount of at least 0.1 percent by weight, preferably at least 0.2 percent by weight, and more preferably at least 0.3 percent by weight, based on the total weight of the compositions. Additive (b) is also typically present in the composition of the instant invention in an amount of less than 10 percent by weight, preferably less than 5 percent by weight and more preferably less than 2 percent by weight, based on the total weight of the composition. The amount of additive (b) present in the composition of the instant invention may range between any combination of these values, inclusive of the recited values.

Additive (b) may be represented by general formula II, wherein $R_2$ is a monovalent organic radical having a terminal ethylenically unsaturated group, such as those groups selected from terminally unsaturated $C_2$–$C_{18}$ alkenyl (e.g., vinyl, allyl, and substituted allyl) acrylyl, acrylyl ($C_1$–$C_{10}$) alkylene, methacrylyl, methacrylyl ($C_1$–$C_{10}$)alkylene, vinylphenylene and vinylphenylene ($C_1$–$C_6$)alkylene. The terminally unsaturated $C_2$–$C_{18}$ alkenyl group may be represented by the following general formula III:

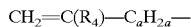

$$CH_2=C(R_4)-C_aH_{2a}-\qquad\qquad III$$

wherein a is a number between 0 and 16, and $R_4$ is hydrogen, halogen or a $C_1$ to $C_4$ alkyl group. Most commonly, $R_4$ is hydrogen. When a is 0 and $R_4$ is hydrogen, the alkenyl group is vinyl, i.e., $CH_2=CH-$. When a is 1 and $R_4$ is hydrogen, the alkenyl group is allyl, i.e., $CH_2=CH-CH_2-$. When a is 1 and $R_4$ is other than hydrogen, e.g., methyl, $R_2$ as represented by general formula III is a substituted allyl group, e.g., 2—methylallyl ($CH_2=C(CH_3)-CH_2-$).

The acrylyl, acrylyl ($C_1$–$C_{10}$)alkylene, methacrylyl and methacrylyl ($C_1$–$C_{10}$)alkylene groups may be represented by the following general formula IV:

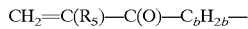

$$CH_2=C(R_5)-C(O)-C_bH_{2b}-\qquad\qquad IV$$

wherein $R_5$ is hydrogen or methyl and b is a number from 0 to 10. When b is 0 and $R_5$ is hydrogen, the group is acrylyl, i.e., $CH_2=CH-C(O)-$. When b is 0 and $R_5$ is methyl, the group is methacrylyl, i.e., $CH_2=C(CH_3)-C(O)-$. When $R_5$ is hydrogen and b is 1, the group is acrylyl methylene, i.e., $CH_2=C(H)-C(O)-CH_2-$.

The vinylphenylene and vinylphenylene ($C_1$—$C_6$) alkylene groups may be represented by the following general formula V:

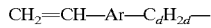

$$CH_2=CH-Ar-C_dH_{2d}-\qquad\qquad V$$

where Ar is phenylene and d is a number between 0 and 6. When d is 0, the group is vinylphenylene, i.e., $CH_2=CH-$ Ar—. When d is 1, the group is vinylphenylene methylene, i.e., $CH_2=CH-Ar-CH_2-$.

In general formula II, $-R_3O-$ ($R_3O$) is a divalent radical (substituted or unsubstituted) derived from an epoxide other than ethylene oxide, or mixture of such other epoxides. As used herein and in the claims, by "epoxide" is meant a cyclic ether. In particular, $R_3O$ may be derived from $C3$–$C_{14}$ alkylene oxide, cycloalkylene oxide having from 5 to 12 carbon atoms in the ring and mixtures thereof. Examples of alkylene oxides from which $-R_3O-$ may be derived include, but are not limited to, propylene oxide, (2,3-epoxypropyl)benzene, 1,2-epoxy-3-phenoxypropane, butylene oxide, e.g., 1,2-butylene oxide and 2,3-butylene oxide, pentylene oxide, e.g., 1,2-pentylene oxide and 2,3-pentylene oxide, hexylene oxide, e.g., 1,2-hexylene oxide, octylene oxide, e.g., 1,2-octylene oxide, decylene oxide, e.g., 1,2-epoxydecane, dodecylene oxide, e.g., 1,2-epoxydodecane, and epoxytetradecane, e.g., 1,2-epoxytetradecane. Cycloalkylene oxides from which $R_3O$ may be derived include, but are not limited to, cyclopentene oxide, cyclohexene oxide, exo-2,3-epoxynorborane, cyclooctene oxide and cyclododecane epoxide.

In a preferred embodiment of the present invention, the $R_3O$ radical is derived from an epoxide selected from the group consisting of hexylene oxide, cyclohexene oxide, pentylene oxide, cyclopentene oxide, butylene oxide, propylene oxide and mixtures thereof. In a particularly preferred embodiment of the present invention, the $R_3O$ radical is derived from butylene oxide, and in particular, 1,2-butylene oxide.

In general formula II, when m is greater than 0, m and n may each independently be numbers of at least 3, for example, at least 5 or 10. When m is greater than 0, the values of m and n may each be independently selected from numbers of less than 100, for example less than 50 or 20. When m is 0, n may be a number of at least 3, for example at least 5, 10 or 20, and n may be a number of less than 100, for example, less than 50, 40 or 30. The values of m and n may each independently range between any combination of these numbers, inclusive of the recited numbers. In a preferred embodiment of the present invention, m is a number of from 10 to 15, e.g., 12 to 15, and n is a number from 10 to 40, e.g., 15 to 35. As a result of the method(s) by which additive (b) may be prepared (as described further herein), the values of m and n as presented herein represent average numbers, as is known to the skilled artisan.

The ratio of m:n is related to the Hydrophilic-Lipophilic Balance (HLB) of additive (b). Relative to an m n ratio of 1:1, when m is greater than n, additive (b) is more hydrophobic, and when n is greater than m, additive (b) is correspondingly more hydrophilic. The specific ratio, or range of ratios, of m:n selected for additive (b) will depend, in part, on the polyol(allyl carbonate) monomers used in the composition of the present invention. The HLB values of additive materials represented by general formula II may vary widely, for example, from 0.4 to 20, or from 6.9 to 14. In the present invention, when m is greater than 0, the ratio of m:n may range from, for example, 1.5:1 to 1:4, e.g., 1:1.25 to 1:1.5.

The additive represented by general formula II may be prepared by art-recognized methods, which typically involve a two and optionally a three stage reaction scheme when m is greater than 0, and a one or two stage reaction scheme when m is 0. When m is greater than 0, a precursor alcohol $R_2$—OH, wherein $R_2$ is as described previously herein, is reacted in the first stage of the reaction with the desired amount of the epoxide from which $R_3O$ is derived, e.g., 1,2-butylene oxide, to form a first intermediate. In the second stage of the reaction, the first intermediate is further reacted with the desired amount of ethylene oxide to form a hydroxyethylene terminated intermediate. When m is 0, the precursor alcohol $R_2$—OH, is reacted with the desired amount of ethylene oxide to form a hydroxyethylene terminated intermediate. If X is hydroxyl, then the hydroxyethylene terminated intermediate is the desired product and no further reactions are required. However, if X is to be any of the other groups, as previously recited herein, e.g., halide, then additional reactions are typically required to convert the terminal hydroxyl group of the hydroxyethylene terminated intermediate to the desired X group. A further description of the preparation of the hydroxyl terminated additive (b) may be found in U.S. Pat. No. 5,296,627, at column 4, lines 43 through 68, the disclosure of which is incorporated herein by reference. In a preferred embodiment of the present invention, X is hydroxyl.

In general formula II, X may be selected from salts of the acids as previously recited herein, e.g., acetic acid. The salts or anionic groups may be formed by contacting the acid with a base, e.g., an alkali metal hydroxide, alkaline earth metal hydroxide or tertiary amine, or as a result of the method by which the hydroxyl group of the hydroxyethylene terminated intermediate is converted into the desired alternative group. Examples of specific salts of the recited acids from which X may be selected include, but are not limited to, sodium acetate, triethylammonium acetate, sodium sulfonate, ammonium sulfate, sodium isethionate, sodium monophosphate and sodium diphosphate.

When it is desired that the terminal group X of additive (b) be halide, e.g., —Cl, the hydroxyethylene terminated intermediate is typically reacted with thionyl halide, e.g., thionyl chloride, or carbonyl halide, e.g., carbonyl chloride, followed by decarboxylation, as is known to those of ordinary skill in the art. The halide terminated additive may be further used to prepare additives having terminal quaternary ammonium groups, the acid groups sulfonic acid and isethionic acid, and salts of these acid groups. Terminal quaternary ammonium groups may be added to additive (b) by reacting the halide terminated additive with a tertiary amine, e.g., —N($R_6$)($R_7$)$R_8$, wherein $R_6$, $R_7$ and $R_8$ are each selected from alkyl and hydroxyalkyl groups, particularly groups containing from 1 to 5 carbon atoms, e.g., trimethylamine, triethylamine, triethanolamine and diethylmethylamine. Additives according to general formula II having terminal sulfonic acid groups may be prepared by reacting the halide terminated additive with an alkali metal sulfite, such as sodium sulfite, followed by known acidification methods. Terminal isethionic acid groups may be added by reacting the halide terminated additive with isethionic acid in the presence of base, e.g., sodium hydroxide, followed by acidification.

Preparation of additive (b), wherein X is sulfuric acid may be accomplished by reacting the hydroxyethylene terminated intermediate with chlorosulfonic acid, 100 percent sulfuric acid or with sulfur trioxide. Neutralization of the reaction product with an alkaline reagent, e.g., sodium hydroxide, yields the corresponding anionic salt, e.g., sodium sulfate in the case of sodium hydroxide. Similarly, the hydroxyethylene terminated intermediate may be reacted with polyphosphoric acid ($P_2O_5 \cdot 2H_2O$) or chloroacetic acid by known methods to prepare additives wherein X is phosphoric acid or acetic acid, respectively.

Processes for converting the terminal hydroxyl of additive (b) to halide, quaternary ammonium, the acid groups acetic acid, sulfonic acid, sulfuric acid, isethionic acid and phosphoric acid, and salts of these acid groups, as summarized above are known to the skilled artisan, and are described in further detail in U.S. Pat. No. 5,296,627, at column 3, line 43 through column 4, line 42, the disclosure of which is incorporated herein by reference.

With further reference to general formula II, X may be selected from alkoxy groups, i.e., —$OR_9$, to form terminal ether groups wherein $R_9$ is an alkyl group having from 1 to 6 carbon atoms, preferably 1 to 4 carbon atoms and more preferably 1 to 3 carbon atoms, or a cycloalkyl group having 5 or 6 carbon atoms in the ring. Alkyl groups from which $R_9$ may be selected include, for example, n-hexyl, n-pentyl, isopentyl, n-butyl, isobutyl, n-propyl, isopropyl, ethyl and methyl. Cycloalkyl groups from which $R_9$ may be selected include, for example, cyclohexyl and cyclopentyl. A preferred alkoxy group is methoxy, i.e., $R_9$ is methyl. Additives for which X is an alkoxy group may be prepared by known methods. For example, when X is halide, e.g., chloride, reaction with an alkoxide, e.g., potassium methoxide, results in the formation of a terminal ether group, e.g., methyl ether.

The additive represented by general formula II may also have a terminal carboxylic acid ester group, i.e., X is —O—C(O)$R_{10}$, wherein $R_{10}$ is an alkyl group having from 1 to 6 carbon atoms, preferably 1 to 4 carbon atoms, and more preferably from 1 to 3 carbon atoms, or a cycloalkyl group having 5 or 6 carbon atoms in the ring. Alkyl groups from which $R_{10}$ may be selected include, for example, n-hexyl, n-pentyl, isopentyl, n-butyl, isobutyl, n-propyl, isopropyl, ethyl and methyl. Examples of cycloalkyl groups from which $R_{10}$ may be selected include cyclohexyl and cyclopentyl. A preferred carboxylic acid ester group is acetic acid ester, for which $R_{10}$ of —O—C(O)$R_{10}$ is methyl. Additives according to general formula II for which X is a carboxylic acid ester group may be prepared by art-recognized methods. For example, the hydroxyl terminated additive may be reacted with an acid halide, e.g., acetyl chloride, to convert X from a hydroxyl group to a carboxylic acid ester group, e.g., acetic acid ester.

The polymerizable organic composition of the present invention includes a radically polymerizable monomer as described above with reference to general formula I, which may be further described as a polyol(allyl carbonate) monomer. Polyol(allyl carbonate) monomers that may be used in the aforedescribed polymerizable organic composition are allyl carbonates of, for example, linear or branched aliphatic polyols, e.g., aliphatic glycol bis(allyl carbonate) compounds, and cycloaliphatic polyols. The scope of the present invention also includes allyl carbonates of aromatic polyols, e.g., 4,4'-isopropylidenediphenol bis(allyl carbonate). These monomers may further be described as unsaturated polycarbonates of polyols, e.g., glycols. The polyol(allyl carbonate) monomer may be prepared by procedures well known in the art, e.g., as described in U.S. Pat. Nos. 2,370,567 and 2,403,113.

In reference to general formula I, $R_1$ is a radical derived from an allyl group which may be substituted at the 2-position with a halogen, most notably chlorine or bromine, or an alkyl group containing from 1 to 4, e.g., 1 to 2, carbon atoms. Generally, the alkyl substituent is methyl or ethyl.

The $R_1$ radical may be represented by the following general formula VI:

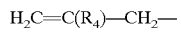

$H_2C=C(R_4)-CH_2-$     VI wherein $R_4$ is as described previously herein. Most commonly, $R_4$ is hydrogen and consequently $R_1$ is the unsubstituted allyl group, $H_2C=CH-CH_2-$.

With reference to general formula I, R is a polyvalent radical derived from a polyol, which can, for example, be an aliphatic or cycloaliphatic polyol, containing 2, 3 or 4 hydroxy groups. Typically, the polyol contains 2 hydroxy groups, i.e., a glycol. When the polyol is an aliphatic polyol, it may be linear or branched and contain from 2 to 10 carbon atoms. Commonly, the aliphatic polyol is an alkylene glycol having from 2 to 4 carbons atoms, e.g., ethylene glycol, propylene glycol, trimethylene glycol, tetramethylene glycol, or a poly($C_2$–$C_4$) alkylene glycol, e.g., diethylene glycol, triethylene glycol, etc.

Specific examples of polyol(allyl carbonate) monomers that may be used in the present invention include, but are not limited to, ethylene glycol bis(2-chloroallyl carbonate), ethylene glycol bis(allyl carbonate), diethylene glycol bis(2-methylallyl carbonate), diethylene glycol bis(allyl carbonate), triethylene glycol bis(allyl carbonate), propylene glycol bis(2-ethylallyl carbonate), 1,3-propanediol bis(allyl carbonate), 1,3-butanediol bis(allyl carbonate), 1,4 butanediol bis(2-bromoallyl carbonate), dipropylene glycol bis (allyl carbonate), trimethylene glycol bis(2-ethylallyl carbonate), pentamethylene glycol bis(allyl carbonate), 1,4-cyclohexanediol bis(allyl carbonate) and 4,4'-isopropylidenebiscyclohexanol bis(allyl carbonate).

A preferred polyol(allyl carbonate) monomer in the composition of the present invention is diethylene glycol bis (allyl carbonate). Commercially available examples of diethylene glycol bis(allyl carbonate) monomers include CR-39® monomer and HIGH ADC CR-39® monomer, Chemical Abstracts (CAS) No. 142-22-3, available from PPG Industries, Inc.

A detailed description of polyol(allyl carbonate) monomers that may be used in the polymerizable organic compositions of the present invention may be found in U.S. Pat. No. 4,637,698 at column 3, line 33 through column 5, line 61. That disclosure is hereby incorporated by reference, and is summarized above.

As used in the present description with reference to the radically polymerizable monomer represented by general formula I, the term "polyol(allyl carbonate) monomer" and like names, e.g., diethylene glycol bis(allyl carbonate), is intended to mean and include the named monomers or prepolymers thereof and any related monomer or oligomer species contained therein.

The polyol(allyl carbonate) monomer is typically present in the polymerizable organic composition of the present invention in an amount of at least 90 percent by weight, preferably at least 95 percent by weight, and more preferably at least 98 percent by weight, based on the total weight of the polymerizable organic composition. Also, the polyol(allyl carbonate) monomer is typically present in the composition in an amount of not greater than 99.9 percent by weight, preferably not greater than 99.8 percent by weight, and more preferably not greater than 99.7 percent by weight, based on the total weight of the polymerizable organic composition. The polyol(allyl carbonate) monomer may be present in the composition of the present invention in an amount ranging between any combination of these values, inclusive of the recited values.

Polymerization of the polymerizable organic composition of the present invention may be accomplished by adding to the composition an initiating amount of material capable of generating free radicals, such as organic peroxy compounds, i.e., an initiator. Methods for polymerizing polyol(allyl carbonate) compositions are well known to the skilled artisan and any of those well known techniques may be used to polymerize the aforedescribed polymerizable organic compositions.

Suitable examples of organic peroxy compounds, that may be used as initiators include: peroxymonocarbonate esters, such as tertiarybutylperoxy isopropyl carbonate; peroxydicarbonate esters, such as di(2-ethylhexyl) peroxydicarbonate, di(secondary butyl) peroxydicarbonate and diisopropylperoxydicarbonate; diacylperoxides, such as 2,4-dichlorobenzoyl peroxide, isobutyryl peroxide, decanoyl peroxide, lauroyl peroxide, propionyl peroxide, acetyl peroxide, benzoyl peroxide, p-chlorobenzoyl peroxide; peroxyesters such as t-butylperoxy pivalate, t-butylperoxy octylate, and t-butylperoxyisobutyrate; methylethylketone peroxide, acetylcyclohexane sulfonyl peroxide, and azobisisobutyronitrile. Preferred initiators are those that do not discolor the resulting polymerizate. A preferred initiator is diisopropylperoxydicarbonate.

The amount of initiator used to initiate and polymerize the polymerizable organic compositions of the present invention may vary and will depend on the particular initiator used. Only that amount that is required to initiate and sustain the polymerization reaction is required, i.e., an initiating amount. With respect to the preferred peroxy compound, diisopropylperoxydicarbonate, typically between 2.0 and 5.0 parts of that initiator per 100 parts of the polymerizable organic composition (phm) may be used. More usually, between 2.5 and 4.0 phm is used to initiate the polymerization. The amount of initiator and the consequent cure cycle should be adequate to produce a polymerizate having a 15 second Barcol hardness of at least 1, preferably, at least 4, e.g., from 4 to 35. Typically, the cure cycle involves heating the polymerizable organic composition in the presence of the initiator from room temperature to 104° C. over a period of from 15 hours to 30 hours.

Various conventional additives may be incorporated into the polymerizable organic composition of the present invention. Such conventional additives may include light stabilizers, heat stabilizers, ultraviolet light absorbers, mold release agents, pigments and flexibilizing additives that are not radically polymerizable, e.g., alkoxylated phenol benzoates and poly(alkylene glycol) dibenzoates. Conventional additives are typically present in the compositions of the present invention in amounts totaling less than 10 percent by weight, preferably less than 5 percent by weight, and more preferably less than 3 percent by weight, based on the total weight of the polymerizable composition.

Polymerizates obtained from polymerization of polymerizable organic compositions of the present invention will be solid, transparent and substantially free of tinting defects.

The present invention is more particularly described in the following examples, which are intended to be illustrative only, since numerous modifications and variations therein will be apparent to those skilled in the art. Unless otherwise specified, all parts and percentages are by weight.

CASTING COMPOSITION EXAMPLES

The following summarizes polymerizable organic casting compositions that are comparative and according to the present invention. Casting composition A is a comparative composition, and Casting composition B is a composition according to the present invention.

Casting Compositions

| Ingredients | (Parts by weight) A | B |
|---|---|---|
| CR-39 ® monomer (a) | 100 | 99.5 |
| diisopropylperoxydicarbonate | 2.75 | 2.75 |
| Additive (b) | 0 | 0.5 |

(a) CR-39 ® diethylene glycol bis(allyl carbonate) monomer available commercially from PPG Industries, Inc.
(b) Allyl alcohol 1,2-butoxylate-block-ethoxylate having an HLB value of 6.9, was obtained from Aldrich Chemical Company, Inc., 1996–1997 catalogue, page 43, product number 43,312-8.

CAST LENS EXAMPLES

The casting compositions A and B were each mixed at room temperature and injected separately into glass lens molds used to prepare circular lenses having a +2 diopter and an outer rim diameter of 6.5 cm. Twenty (20) lens molds were filled at a time and their contents polymerized using the cure cycle described in Table 1.

TABLE 1[c]

Cast Lens Cure Cycle

| Temperature | Time (Hours) |
|---|---|
| 44° C. to 58° C. | 10.1 |
| 58° C. to 64° C. | 1.9 |
| 64° C. to 70° C. | 2.5 |
| 70° C. to 77° C. | 0.7 |
| 77° C. to 85° C. | 1.0 |
| 85° C. to 90° C. | 0.3 |
| 90° C. to 104° C. | 0.5 |
| 104° C. Hold | 0.25 |
| 104° C. to 80° C. | 2.0 |
| 80° C. Hold | Until demolded. |

[c]The rate of temperature change represented in Table 1 was, in all instances, linear.

The cast lenses were then tinted by imbibing them with a black dye. An aqueous tinting solution of 1 part BPI® Molecular Catalytic® Black Dye, commercially available from Brain Power Incorporated, and 10 parts deionized water was heated to and held at a temperature of 95520 C. The lenses cast from casting compositions A and B were fully immersed in the heated dye solution for a period of 5 minutes, after which they were thoroughly rinsed with deionized water. The tinted lenses were evaluated for tinting defects, the results of which are summarized in Table 2.

TABLE 2

Evaluation of Tinted Lenses

| Casting Composition | Number of Tinted Lenses Evaluated | Number of Tinted Lenses Observed To Have Tinting Defects (d) |
|---|---|---|
| A | 52 | 7 |
| B | 65 | 0 |

(d) The lenses were evaluated for tinting defects by means of visual naked eye inspection. Tinting defects were observed as having a lighter colored vein or fern-like appearance relative to the rest of the tinted lens.

The results summarized in Table 2 show that articles, e.g., lenses, cast from a polymerizable organic composition according to the present invention, such as Composition B, have fewer tinting defects than lenses cast from comparative compositions, such as Composition A.

The present invention has been described with reference to specific details of particular embodiments thereof. It is not intended that such details be regarded as limitations upon the scope of the invention except insofar as and to the extent that they are included in the accompanying claims.

We claim:

1. A polymerizable organic composition comprising:
    (a) a radically polymerizable monomer represented by the following general formula,

    $$R \text{---} [\text{---}O\text{---}C(O)\text{---}O\text{---}R_1]_i$$

wherein R is a radical derived from a polyol having two or more hydroxy groups, $R_1$ is a radical derived from an allyl or substituted allyl group and i is a whole number from 2 to 4; and (b) an additive represented by the following formula,

    $$R_2\text{---}O\text{---}(R_3O)_m\text{---}(CH_2CH_2O)_{n-1}\text{---}CH_2CH_2\text{---}X$$

wherein $R_2$ is a monovalent organic radical having a terminal ethylenically unsaturated group, $R_3O$ is a divalent radical derived from an epoxide other than ethylene oxide, m is a number from 0 to 100, n is a number from 3 to 100, and X is selected from the group consisting of halide, hydroxyl, quaternary ammonium groups, the acid groups acetic acid, sulfonic acid, sulfuric acid, isethionic acid and phosphoric acid, salts of said acid groups, alkoxy groups and carboxylic acid ester groups, said additive being present in said composition in an amount at least sufficient such that a polymerizate of said composition is substantially free of tinting defects.

2. The composition of claim 1 wherein $R_2$ is selected from the group consisting of vinyl, allyl, substituted allyl, (meth)acrylyl, (meth)acrylyl($C_1$–$C_{10}$)alkyl, vinylphenyl and vinylphenylene($C_1$–$C_6$)alkyl.

3. The composition of claim 1 wherein $R_3O$ is derived from $C_3$–$C_{14}$ alkylene oxide, cycloalkylene oxide having from 5 to 12 carbon atoms in the ring and mixtures thereof.

4. The composition of claim 3 wherein $R_3O$ is derived from an epoxide selected from the group consisting of hexylene oxide, cyclohexene oxide, pentylene oxide, cyclopentene oxide, butylene oxide, propylene oxide and mixtures thereof.

5. The composition of claim 1 wherein m is a number from 10 to 15, n is a number of from 10 to 40, and the ratio of m n is from 1.5:1 to 1:4.

6. The composition of claim 1 wherein the polyol from which R is derived is a poly ($C_2$–$C_4$) alkylene glycol or 4,4'-isopropylidenediphenol, and i is 2.

7. The composition of claim 6 wherein the polyol from which R is derived is diethylene glycol, and $R_1$ is allyl.

8. A polymerizable organic composition comprising:
    (a) a radically polymerizable monomer represented by the following general formula,

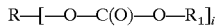
    $$R\text{---}[\text{---}O\text{---}C(O)\text{---}O\text{---}R_1]_i$$

wherein R is a radical derived from a polyol having two or more hydroxy groups, $R_1$ is a radical derived from an allyl or substituted allyl group and i is a whole number from 2 to 4; and (b) an additive represented by the following formula,

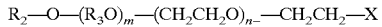
    $$R_2\text{---}O\text{---}(R_3O)_m\text{---}(CH_2CH_2O)_{n-}\text{---}CH_2CH_2\text{---}X$$

wherein $R_2$ is a monovalent radical selected from the group consisting of vinyl, allyl, substituted allyl, (meth)acrylyl, (meth)acrylyl($C_1$–$C_{10}$)alkyl, vinylphenyl and vinylphenylene($C_1$–$C_6$)alkyl, $R_3O$ is a divalent radical derived from an epoxide selected from the group consisting of $C_3$–$C_{14}$ alkylene oxide, cycloalkylene oxide having from 5 to 12 carbon atoms in the ring and mixtures thereof, m is a number from 0 to 100, n is a number from 3 and 100, and X is selected from the group consisting of halide, hydroxyl, quaternary ammonium groups, the acid groups acetic acid, sulfonic acid, sulfuric acid, isethionic acid and phosphoric acid, salts of said acid groups, alkoxy groups and carboxylic acid ester groups, said additive being present in said composition in an amount at least sufficient such that a polymerizate of said composition is substantially free of tinting defects.

9. The composition of claim 8 wherein R is derived from diethylene glycol, $R_1$ and $R_2$ are each allyl, i is 2, and $R_3O$ is derived from 1,2-butylene oxide.

10. The composition of claim 9 wherein m is a number from 10 to 15, n is a number of from 10 to 40, the ratio of m:n being from 1.5:1 to 1:4, and X is hydroxyl.

11. The composition of claim 10 wherein said additive is present in said composition in an amount of from 0.1 percent by weight to 10 percent by weight, based on the total weight of said composition.

12. The polymerizate of claim 1.

13. The polymerizate of claim 10.

14. The polymerizate of claim 13 wherein said polymerizate is a lens having a positive diopter.

* * * * *

UNITED STATES PATENT AND TRADEMARK OFFICE
CERTIFICATE OF CORRECTION

PATENT NO.   : 6,077,921
DATED        : June 20, 2000
INVENTOR(S)  : Vidhu J. Nagpal et al.

It is certified that error appears in the above-identified patent and that said Letters Patent is hereby corrected as shown below:

Column 3,
Line 6, change "if they 10 are" to -- if they are --.

Column 9,
Line 44, change "9520 C." to -- 95°C. --.

Column 10,
Line 47, change "mn" to -- m:n --.
Line 64, change "$R_2-O-(R_3O)_m-(CH_2CH_2O)_n-CH_2CH_2-X$" to -- $R_2-O-(R_3O)_m-(CH_2CH_2O)_{n-1}-CH_2CH_2-X$ --.

Signed and Sealed this

Fourth Day of September, 2001

Attest:

NICHOLAS P. GODICI
*Attesting Officer*   *Acting Director of the United States Patent and Trademark Office*